Aug. 8, 1950 — H. S. GRAHAM — 2,517,557
APPARATUS FOR SMELTING OF METALS
Filed June 14, 1947

INVENTOR
HUGH S. GRAHAM
By J. Cashman
ATTORNEY

Patented Aug. 8, 1950

2,517,557

UNITED STATES PATENT OFFICE 2,517,557

APPARATUS FOR SMELTING OF METALS

Hugh S. Graham, Cambridge, Mass., assignor to Standard Oil Development Company, a corporation of Delaware Application June 14, 1947, Serial No. 754,637

3 Claims. (Cl. 266—33)

The present invention is directed to a method and apparatus for purifying metals by smelting and particularly for purifying powdered metal mixed with impurities, such as powdered iron.

In my co-pending application Serial No. 18,390, filed April 1, 1948, "Smelting of Metals," I have claimed a process for smelting metal powders in which slag is circulated through a heater and returned to the slag layer, and metal powder is fed to the heated slag near the point of return to the slag layer.

By recently developed technique iron ore is reduced by suspending it in powdered form in a reducing gas. The product of this operation is powdered iron mixed with impurities which are not reducible by the reducing gas. These impurities can only be removed effectively by melting both metal and impurities (usually using slagging agents such as calcium oxide) and separating the immiscible liquids. The melting of the powdered iron has proven extraordinarily difficult from a practical point of view due to its going through a plastic condition before melting, which results in balling up. Moreover, the powdered iron is very susceptible to oxidation.

In most known methods for purifying iron ore by melting, the ore is subjected directly to hot blasts of combustion gases. This procedure is not feasible with powdered iron ore because due to the high heat requirement large amounts of gas must be used and in vessels of practical size this means a high gas velocity which would carry away the powdered iron. Furthermore, extremely careful control of the content in these gases of oxidizing gas, such as $CO_2$, would be necessary since the powdered freshly reduced iron oxidizes very readily and is, in fact, pyrophoric. Pure iron requires a temperature between about 1500° and 1600° C. for melting and at this temperature it can tolerate only a very small percentage of $CO_2$ in the heating gas where the latter comes in direct contact with the iron. This temperature can, of course, be reduced by mixing carbon with the iron. Suitable quantities of carbon will reduce the melting point of the iron to about 1100° C. at which temperature the iron can tolerate considerably more carbon dioxide or other oxidizing gas in contact with it. However, at this temperature carbon has practically no tolerance for oxidizing gases with the result that even at these temperatures if there is any substantial content of $CO_2$ or other oxidizing gas in the hot gases contacting the ore the carbon will burn out and the iron will solidify or freeze.

It is the principal object of the present invention to provide a method and apparatus by which iron powder can be readily melted for purification without having the iron powder come in contact with any combustion gases.

Another object of the present invention is the provision of a method and an apparatus of the type indicated in which high velocity of heating gas to get high heat release per unit volume may be employed without incurring the risk of blowing the iron powder out of the furnace.

A more specific object of the present invention is the provision of a method and apparatus of the type indicated in which impure powdered metal is continuously fed to a layer of molten slag overlying a layer of molten metal, molten material is continuously withdrawn from the melt, heated with a rapidly flowing heating gas and returned to the melt to carry heat into the smelting operation.

A further object of the present invention is the provision of a method and apparatus of the type indicated in which the powdered impure metal is fed to the furnace in such a manner as to mix thoroughly with the heated molten material as the latter is returned to the melt to insure the sinking of the powdered metal through the slag layer.

An additional object of the present invention is the provision of a method and apparatus of the type indicated in which the recycled heated molten material is fed onto an apron overlying the melt and the powdered impure metal is simultaneously fed on to the same apron and the mixture is discharged onto the top of the melt over a relatively large area thereof.

Further objects and advantages of the present invention will appear from the following detailed description of the accompanying drawing, in which.

Figure 1:
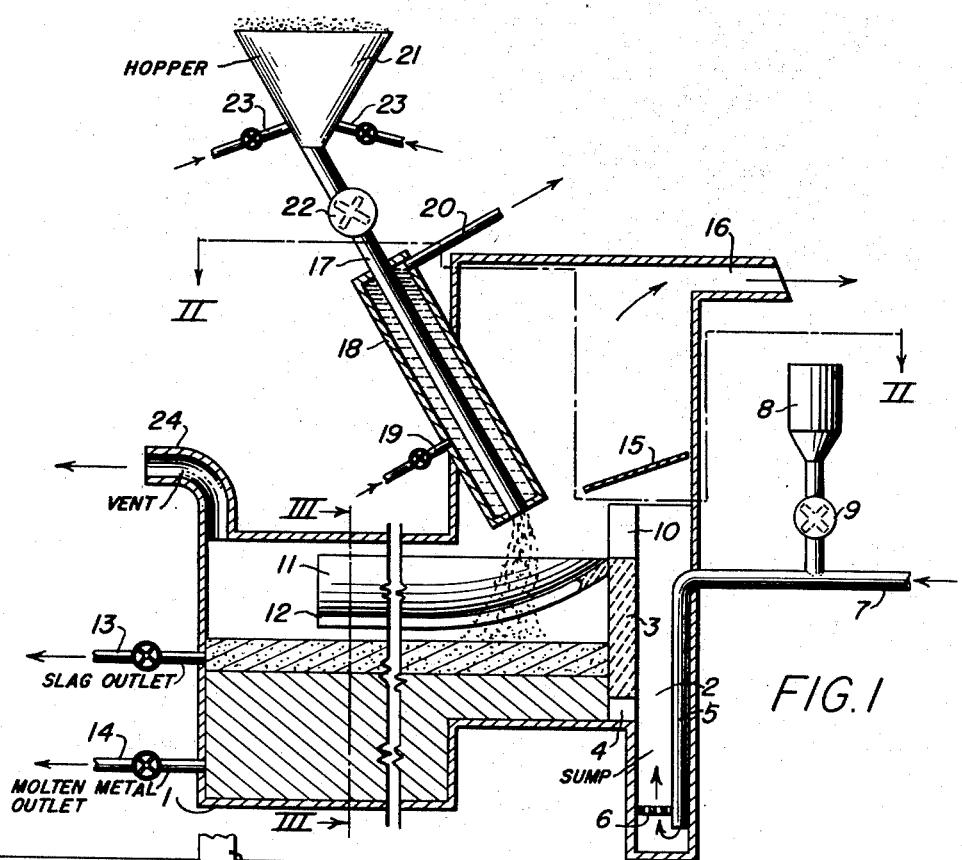
Fig. 1 is a vertical longitudinal section of one embodiment of an apparatus according to the present invention.
Figure 2:
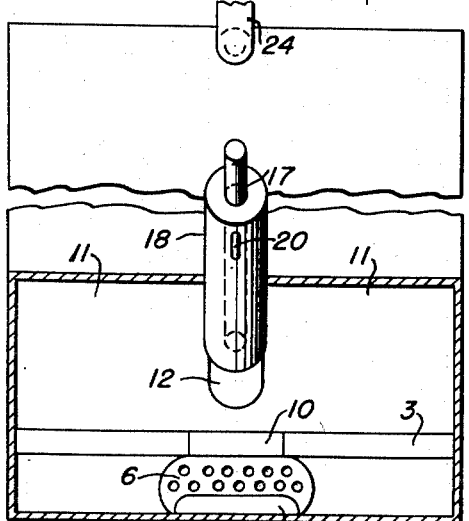
Fig. 2 is a section along the line II—II of Fig. 1.
Figure 3:
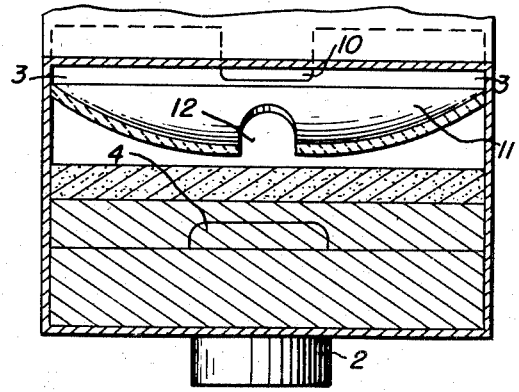
Fig. 3 is a section along the line III—III of Fig. 1.

Referring to the drawing in detail, numeral 1 designates a furnace which can assume any desired configuration and which will be constructed of the materials and with the type of construction customary in furnaces of this type. It will be understood that details, such as fire brick lining, supports for partitions, and the like, are omitted in order more simply to illustrate the principle of the present invention. On one side the furnace is provided with a sump 2 the defining wall 3 of which extends well up into the furnace. This wall has an opening 4 near the floor of the furnace to permit molten material to run from the floor of the furnace into the sump. On the furnace wall side of the sump is an inlet duct 5 terminating near the bottom of the sump below a perforated distributing plate 6. This inlet duct is a continuation of a pipe 7 exterior of the furnace above which is mounted a hopper 8 connected to the pipe 7 through a star feeder or other similar feed control device 9. The wall 3, at its upper end, has on its inner face a cutaway portion 10 which forms a spillway or wier over which molten material from the sump flows onto an apron 11. This apron extends completely across the furnace and abuts against the inner face of the wall 3. It slopes from its three sides toward its front and center. Extending rearwardly from the front of the apron for a substantial distance is a central cutaway portion 12 which is located in the lowermost part of the apron whereby everything which spills over the wier onto the apron flows toward said cutaway portion. The lower surface of the apron is located so as to be just above the normal level of the slag layer in the furnace. The furnace is provided with a drawoff tap 13 for slag and a drawoff tap 14 for metal.

Arranged above the sump are suitably disposed baffles 15 which serve the prevent the carry-over of molten material from the sump to the flue 16 provided at the top of the furnace. Projecting through an upper wall of the furnace forwardly of the baffles is an inlet pipe 17 for aerated powdered impure metal mixed, if desired, with the requisite quantity of slagging elements and carbon. That portion of the pipe which extends into the furnace and which is immediately adjacent the furnace is covered with a cooling jacket 18 having an inlet 19 and an outlet 20 for a cooling liquid. The purpose of this jacket is to keep the temperature inside the tube below the temperature at which the powdered metal becomes plastic so that it will not plug up the tube. The pipe is fed by a hopper 21 through a suitable feed control valve 22. The hopper will ordinarily be provided with suitable aerating jets 23 to keep the powder in a fluffed aerated condition so that it will flow steadily.

The inner end of the feed pipe is so located as to discharge the powdered material into the molten material overflowing the wier onto the apron at a point where the powdered material does not come into contact with the gas leaving the sump so that there is no tendency for the gas to blow the powdered material out of the furnace or to oxidize it in the event that the gas contains substantial quantities of an oxidizing component. The apron is of sufficient length to carry the molten material disposed thereon substantially over the length of the furnace and its central discharge opening is of sufficient length so that this molten material mixed with the powdered metal drops into the melt over a substantial length of the furnace bed. Any gas liberated in the smelting operation is led away from the furnace through a vent 24 which may also be utilized, however, for the purpose of feeding in reducing or inert gas to provide a protective atmosphere over the melt. Suitable fuel jets are arranged around the furnace so that it may be fired into operating temperature before charging.

The furnace is charged and set into operation in the manner usual with open hearth furnaces. With the furnace carrying a layer of molten metal overlaid by a layer of molten slag, as shown in Fig. 1, circulation of a portion of the melt is started by blowing air through the sump. This air burns the carbon or any other impurity in the melt and generates a great quantity of heat. When the material circulated is molten metal, such as molten iron, it is preferred to have a substantial excess of carbon present over that desired in the final iron so that the combustion which occurs in the sump produces a relatively small amount of carbon dioxide. If too much carbon is fed in with the powdered metal it may have a tendency to float on the slag layer, creating an undesirable condition. To this end most of the carbon required for supplying the heat may be fed in from hopper 8 to line 7. The combustion can occur either just outside the furnace or in the sump itself. Usually the latter will be the case.

Because of the large amount of air required to supply the necessary heat when burning carbon primarily to carbon monoxide, the gas velocity through the sump will be high, upwards of 10 ft./second and usually between 40 and 100 ft./second. This high velocity gas exerts a lifting effect upon the molten material in the sump and carries it upwardly through the sump to the point where it spills over the wier onto the apron. The powdered metal, being fed in through pipe 17, mixes with the molten material on the apron and in spilling off the apron it is carried well into the melt so that it will sink through the slag layer. The gases disengage from the molten material at the top of the sump and pass out of the furnace through flue 16.

It will be understood, of course, that instead of feeding air through the duct 5 it is possible to introduce a combustible mixture such as air and natural gas. The gas fed in through the duct 5 is preferably preheated by the stack gases. These stack gases have high fuel and reducing values and may utilized accordingly. For the preheating of the air feed to the furnace these gases may be utilized in equipment such as recuperators or regenerators or heat exchangers.

The system described is very flexible and permits ready control of the quality of the molten iron withdrawn from the system. Usually the only impurity left in the iron is carbon, the amount of which may be controlled. Where carbon is used as the fuel the amount fed must be sufficient to satisfy the fuel requirements and at the same time supply the amount of carbon desired in the final purified metal. If the furnace is receiving inadequate heat the percentage of carbon in the feed must be increased. If too much carbon is included in the feed it will have a tendency to collect on the slag layer and will interfere with the proper transfer of heat from the slag layer to the rest of the charge. In this case the percentage of carbon in the feed must be reduced. When the metal withdrawn from the furnace is fed to an open hearth or other furnace for further purification the carbon content thereof may be up to about 6%. Where substantially complete purification of the metal in the furnace shown is desired, the carbon content in the molten metal will be maintained at a lower level in the neighborhood of 1% or less.

It will be appreciated that the particular embodiment of the present invention illustrated is only one embodiment contemplated by the present invention. It will be apparent that the principle of feeding the powdered metal to the furnace so that it mixes thoroughly with the recycled heated melt and is distributed fairly widely over the furnace bed can be applied in furnaces of widely varying design. The elements shown in the drawing can assume different positions and can be differently proportioned. The sump, for example, can be located in many different positions, with the flow plan altered to suit the position of the sump with relation to the rest of the furnaces. All such variations in form, proportion, arrangement of parts, and the like, are contemlated within the scope of the present invention.

The nature and objects of the present invention having thus been set forth and specific examples of the same given, what is claimed as new and useful and desired to be secured by Letters Patent is:

1. An open hearth furnace of the character described comprising in combination a floor, side, and end walls forming an elongated melting chamber, a sump disposed adjacent to said chamber, said sump having a wall in common with said melting chamber and said wall being further characterized in that it has a conduit means terminating in said chamber and spaced above said furnace floor in communication with said sump and adapted to the continuous withdrawal of a stream of molten metal underlying a layer of molten slag from said melting chamber, an apron abutting said common wall and extending to a point intermediate the center of said melting chamber and the opposite end wall, the abutment of said apron to said wall being adjacent to the discharge end of said sump, said apron being further characterized in that it is provided with a central opening extending over a substantial portion of its length and that it is inclined downwardly in all directions towards said central opening, means for feeding powdered metal onto said apron and conduit means for feeding gas into the lower end of said sump.

2. The apparatus of claim 1 wherein said apron extends completely across said furnace.

3. The apparatus of claim 1 wherein the lower surface of the apron is located so as to be just above the normal level of the slag layer in said melting chamber.

HUGH S. GRAHAM.

REFERENCES CITED

The following references are of record in the file of this patent:

UNITED STATES PATENTS

| Number | Name | Date |
|---|---|---|
| 817,414 | Brown | Apr. 10, 1906 |
| 894,383 | Imbert | July 28, 1908 |
| 1,535,109 | Davies, Jr. | Apr. 28, 1925 |
| 1,647,608 | Corsalli | Nov. 1, 1927 |
| 2,019,112 | Beekhuis | Oct. 29, 1935 |
| 2,056,499 | Anson | Oct. 6, 1936 |